United States Patent
Luke et al.

(10) Patent No.: US 8,490,953 B2
(45) Date of Patent: Jul. 23, 2013

(54) SPRING COUNTERBALANCE WITH FAILURE DETECTION

(75) Inventors: Scott Osborne Luke, Ben Lomond, CA (US); Giuseppe Prisco, Mountain View, CA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 1080 days.

(21) Appl. No.: 12/165,380

(22) Filed: Jun. 30, 2008

(65) Prior Publication Data

US 2009/0322001 A1     Dec. 31, 2009

(51) Int. Cl.
*F16F 1/00*           (2006.01)
*F16F 9/00*           (2006.01)

(52) U.S. Cl.
USPC .............................. 267/70; 267/73; 248/648

(58) Field of Classification Search
USPC .................. 267/70, 71, 73, 74; 414/601, 602, 414/673, 719, 720; 248/325, 334.1, 123.11, 248/162.1, 280.11, 648, 297.11, 292.13
See application file for complete search history.

(56) References Cited

U.S. PATENT DOCUMENTS

| | | | | |
|---|---|---|---|---|
| 4,076,351 A | * | 2/1978 | Wyant | 312/247 |
| 4,601,446 A | * | 7/1986 | Opsahl | 244/129.5 |
| 2003/0074986 A1 | * | 4/2003 | Yamakawa et al. | 73/862.393 |
| 2005/0093353 A1 | * | 5/2005 | Schussler et al. | 297/284.4 |
| 2007/0156122 A1 | | 7/2007 | Cooper | |
| 2007/0156285 A1 | | 7/2007 | Sillman et al. | |
| 2007/0289217 A1 | * | 12/2007 | Gall | 49/323 |
| 2009/0314869 A1 | * | 12/2009 | Savard et al. | 242/125.1 |

FOREIGN PATENT DOCUMENTS

SU         461896 A   *   8/1975

OTHER PUBLICATIONS

Vertut, Jean et al., *Robot Technology: Teleoperation and Robotics Evolution and Development*, 1986, vol. 3A, 332 pages, English translation Prentice-Hall, Inc., Inglewood Cliffs, NJ, USA.

* cited by examiner

*Primary Examiner* — Melody Burch

(57) ABSTRACT

A spring counterbalance mechanism balances a load with a spring. A cable has a protrusion fixed to the cable midway between two ends of the cable. The two free ends of the cable are fixedly coupled to one of the load or the spring, and a cable attachment is coupled to the remaining member. The cable passes through the cable attachment such that the protrusion is captive in the cable attachment and is movable between two stops in the cable attachment. The cable forms two segments each of which couples the spring to the load. The two segments of the cable pass over a pulley. A sensor coupled to the pulley senses rotation of the pulley allowing cable breakage to be detected by the anomalous rotation of the pulley.

20 Claims, 3 Drawing Sheets

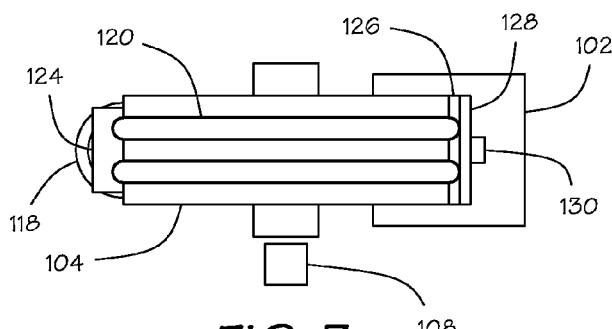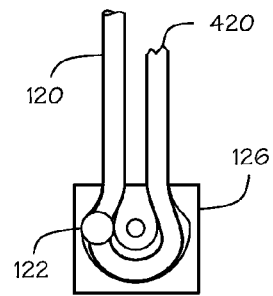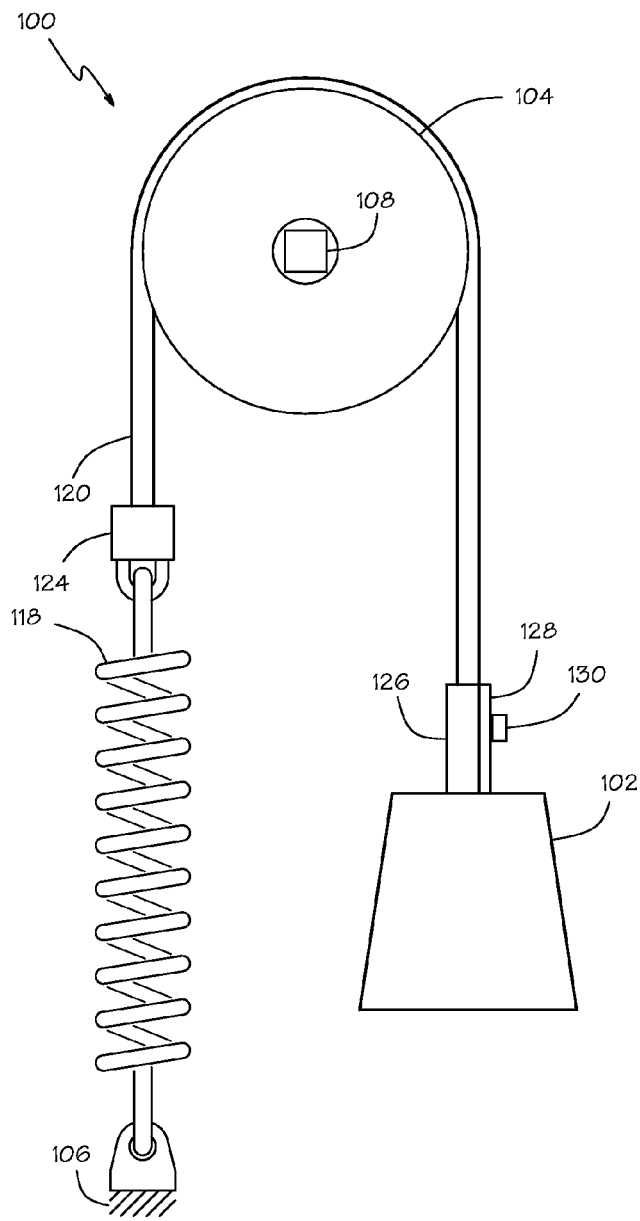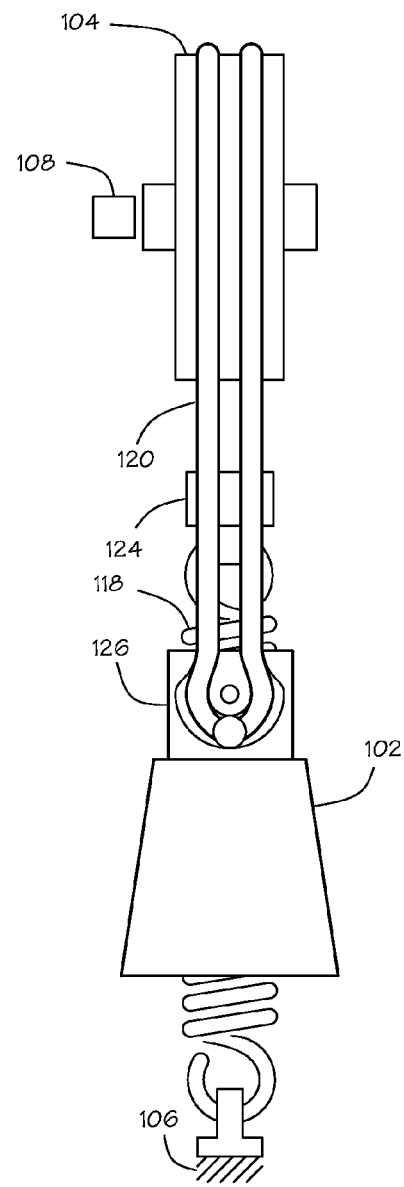
FIG. 3　　FIG. 4
FIG. 1　　FIG. 2

SPRING COUNTERBALANCE WITH FAILURE DETECTION

BACKGROUND

1. Field

Embodiments of the invention relate to the field of counterbalance mechanisms; and more specifically, to spring force counterbalance mechanisms with failure detection.

2. Background

In load positioning systems the effects of gravity on the load may be compensated for with a spring counterbalance. Failures of the spring counterbalance may cause the load to move, which may be an undesirable failure mode. The reliability of a spring counterbalance may be increased by introducing redundancy in the mechanism so that a single failure does not leave the load unbalanced. However, a failure in a redundant system may go unnoticed leaving the system without protection of the redundant element.

It would be desirable to provide a redundant structure for a spring force counterbalance mechanism that detects failures of the redundant elements.

SUMMARY

A spring counterbalance mechanism balances a load with a spring. A cable has a protrusion fixed to the cable midway between two ends of the cable. The two free ends of the cable are fixedly coupled to one of the load or the spring, and a cable attachment is coupled to the remaining member. The cable passes through the cable attachment such that the protrusion is captive in the cable attachment and is movable between two stops in the cable attachment. The cable forms two segments each of which couples the spring to the load. The two segments of the cable pass over a pulley. A sensor coupled to the pulley senses rotation of the pulley allowing cable breakage to be detected by the anomalous rotation of the pulley.

Other features and advantages of the present invention will be apparent from the accompanying drawings and from the detailed description that follows below.

BRIEF DESCRIPTION OF THE DRAWINGS

The invention may best be understood by referring to the following description and accompanying drawings that are used to illustrate embodiments of the invention by way of example and not limitation. In the drawings, in which like reference numerals indicate similar elements:

FIG. 1 is a front view of a counterbalance system that embodies the invention.

FIG. 2 is a side view of the counterbalance system shown in FIG. 1.

FIG. 3 is a top view of the spring counterbalance system shown in FIG. 1.

FIG. 4 is a view of a portion of the spring counterbalance system shown in FIG. 2 with a failure of a redundant cable.

DETAILED DESCRIPTION

Figures 5, 6, 7:
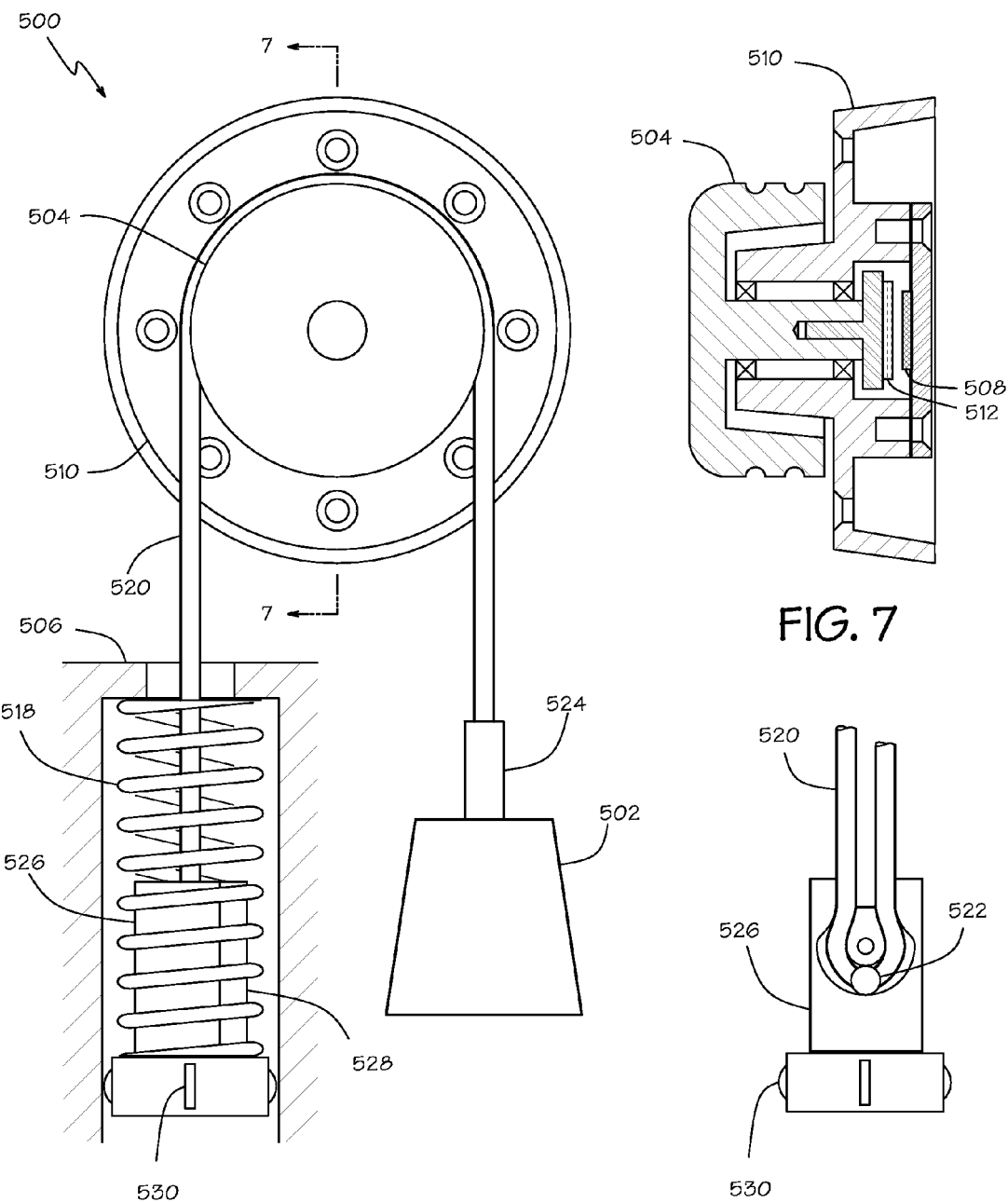
FIG. 5 is a front view of another counterbalance system that embodies the invention.
FIG. 6 is a side view of a portion of the spring counterbalance system shown in FIG. 5.
FIG. 7 is a cross-section view of a portion of the spring counterbalance system shown in FIG. 5 along line 7-7.

In the following description, numerous specific details are set forth. However, it is understood that embodiments of the invention may be practiced without these specific details. In other instances, well-known devices, structures and techniques have not been shown in detail in order not to obscure the understanding of this description.

FIG. 1 shows a front view of a spring counterbalance mechanism 100 with a load 102 balanced by a spring 118. FIG. 2 shows a side view of the spring counterbalance mechanism 100. FIG. 3 shows a top view of the spring counterbalance mechanism 100.

A cable 120 has a protrusion 122 fixed to the cable midway between two ends of the cable. The two ends of the cable 120 are fixedly coupled to either the load or the spring. In the embodiment shown in FIGS. 1-3, the two ends of the cable 120 are fixedly coupled to the spring 118 by a cable fixing device 124. A cable attachment is coupled to the other of the load or the spring. In the embodiment shown in FIGS. 1-3, the cable attachment 126 is coupled to the load 102.

The cable 120 passes through the cable attachment 126 such that the protrusion 122 is captive in the cable attachment and is movable between two stops in the cable attachment. In the embodiment shown in FIGS. 1-3, the cable attachment 126 includes a U-shaped slot or groove through which the cable 120 passes. The central portion of the slot is large enough to allow the protrusion 122 to slide freely. The two end portions of the slot are large enough to allow the cable 120 to slide freely but small enough to provide the two stops that limit the movement of the protrusion 122. A retaining plate 128 may be secured to the cable attachment 126 with a screw 130 or other fastener to retain the cable 120 within the slot of the cable attachment. The retaining plate is not shown in the side view of FIG. 2 to allow the cable 120 and protrusion 122 to be seen within the slot of the cable attachment 126.

The cable 120 forms two segments, each of which couples the spring 118 and the load 102. The protrusion 122 will be located approximately midway between the stops in the cable attachment 126. The two segments of the cable 120 pass over a pulley 104. A sensor 108 is provided to sense rotation of the pulley 104.

In normal operation the load 102 is supported by both of the two segments of the cable 120. FIG. 4 shows the cable attachment 126 and a portion of the cable If one of the segments of the cable breaks 420 as shown in FIG. 4 the entire load 102 will be supported by the remaining cable segment 120 causing the protrusion to slide in the cable attachment 126 until it hits one of the stops. For the purposes of this description, the coupling of the cable 120 to the cable attachment 126 in a manner that allows a limited amount of movement of the cable relative to the cable attachment may be referred to as a loose coupling. This loose coupling will cause an anomalous rotation of the pulley 104 if one of the redundant cable segments breaks. By sensing this anomalous rotation with the sensor 106, the likelihood of a cable breakage having occurred can be detected. This may be important because the redundant cables prevent a large movement of the load if a cable breaks which may allow the loss of redundancy in the counterbalance mechanism to go unnoticed.

In one embodiment, the sensor 108 senses an angular velocity of the pulley 104. In another embodiment, the sensor 108 senses an angular acceleration of the pulley. An unexpectedly high velocity or acceleration may be used to indicate the likelihood of cable breakage. In yet another embodiment, the sensor 108 senses a rotational position of the pulley. The rotational position may be compared to an expected position based on other sensors, such as a sensor of the load position. This may allow cable stretching as well as cable breakage to be detected. Cable stretching may indicate an impending cable breakage.

FIG. 5 shows a front view of another spring counterbalance mechanism 500 with a load 502 balanced by a spring 518. In this embodiment, the spring 518 is compression spring and the cable 520 passes through the spring and is coupled to the spring such that the load 502 causes the spring to be compressed. A compression spring may be considered more reliable than a tension spring for some embodiments of the invention. If a tension spring breaks, it would then be unable to provide any force to counterbalance the load. If a compression coil spring breaks, the coil at the broken point will move slightly to rest on the next coil in the spring. This slight movement may only change the load balancing force by a small amount (e.g., 5-10%), which may be computed by multiplying the space between coils by the spring rate. This slight movement may be detected as an anomalous movement of the pulley 504 is the same manner as previously described for detection of cable breakage.

In the embodiment shown in FIG. 5, a cable 520 has a protrusion 522 fixed to the cable midway between two ends of the cable. The two ends of the cable 520 are fixedly coupled to the load 502 by a cable fixing device 524. A cable attachment 526 is coupled to the load 502. The cable 520 passes through the cable attachment 526 such that the protrusion 522 is captive in the cable attachment and is movable between two stops in the cable attachment. In the embodiment shown in FIG. 5, the cable attachment 526 is configured to engage the distal end of the coil spring 518 and have the cable pass through the spring and emerging at the proximal end of the coil spring which is supported by the frame 506 of the spring counterbalance mechanism 500. The frame 506 may provide a cylindrical chamber in which the coil spring 518 is confined. The cable attachment 526 may include low friction guides 530, such as rollers or plastic skids, that center the distal end of the cable attachment in the cylindrical chamber.

The cable attachment 526 includes a U-shaped slot through which the cable 520 passes and is retained in a manner similar to the cable attachment described above in connection with FIGS. 1-3. A retainer 528 may be fastened to the cable attachment 526 to retain the cable 520 and protrusion 522. FIG. 6 shows a side view of the cable attachment 526 with a portion of the cable 520 that includes the protrusion 522. The retainer is not shown to allow the configuration of the cable 520 and protrusion 522 in the U-shaped slot of the cable attachment 526 to be seen.

FIG. 7 shows a cross-section of the pulley 504 and coupled sensor 508 taken along section line 7-7 of FIG. 5. The pulley 504 may be rotatably supported by a pulley support 510. A magnet 512 may be fixedly coupled to the pulley 504 such that the magnet rotates in unison with the pulley. The sensor 508 detects the rotation of the magnet 512 to detect anomalous movements of the pulley 504 that may indicate a breakage of the cable 520 or the spring 518. The sensor 508 may be a Hall effect array that detects changes in the angular position of the magnet 512.

Figure 8:
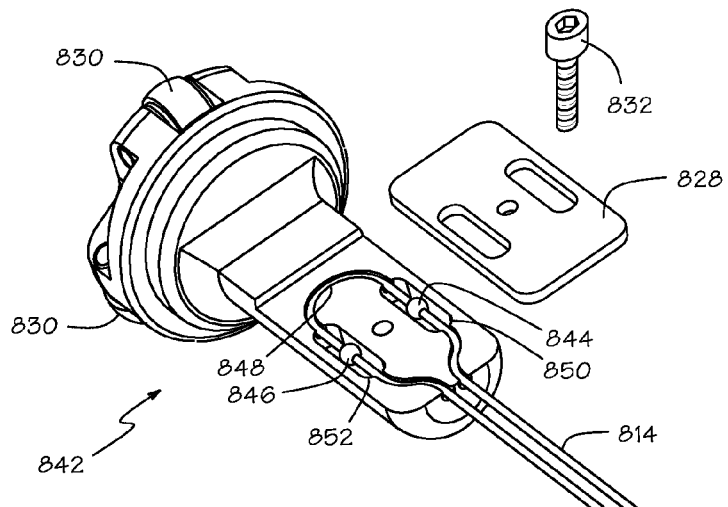
FIG. 8 is a pictorial view of a cable attachment that may be used in an embodiment of the invention.

FIG. 8 shows an exploded pictorial view of another cable attachment 842 that embodies the invention. The cable attachment 842 may include a generally U-shaped channel or slot through which the cable 814 passes. A retaining plate 828 may be fastened to the cable attachment 842, such as with a screw 832, to retain the loop of cable 814 in the channel. Rollers or skids 830 may be provided to allow the cable attachment 842 to move freely along the length of an enclosing structure.

In this embodiment, the cable 814 has two protrusions 844, 846 fixed to the cable midway between two ends of the cable. The two protrusions 844, 846 are spaced apart by a short cable segment 848. The cable 814 passes through the cable attachment 842 such that each of the two protrusions 844, 846 are captive in the cable attachment. Each protrusion may be retained in an enlarged straight portion of the channel in the cable attachment 842 through which the cable 814 passes. An end of the of the enlarged portion of the channel may be reduced in size to permit the cable 814 but not the protrusion 844, 846 to pass through and thereby form a stop 850, 852 that limits the movement of the protrusion in the cable attachment 842. The short cable segment 848 between the two protrusions 844, 846 may make a 180 degree turn in the U-shaped channel. An end of the of the enlarged portion of the channel opposite the stop 850, 852 may also be reduced in size to permit the cable 814 but not the protrusion 844, 846 to pass through and thereby form an additional stop that limits the movement of the protrusion in the cable attachment 842. as in the previously described embodiments, the cable attachment 842 provides a redundant coupling of a load to a spring counterbalance that allows a small amount of cable motion in the event that one of the redundant cable segments breaks.

Figure 9:
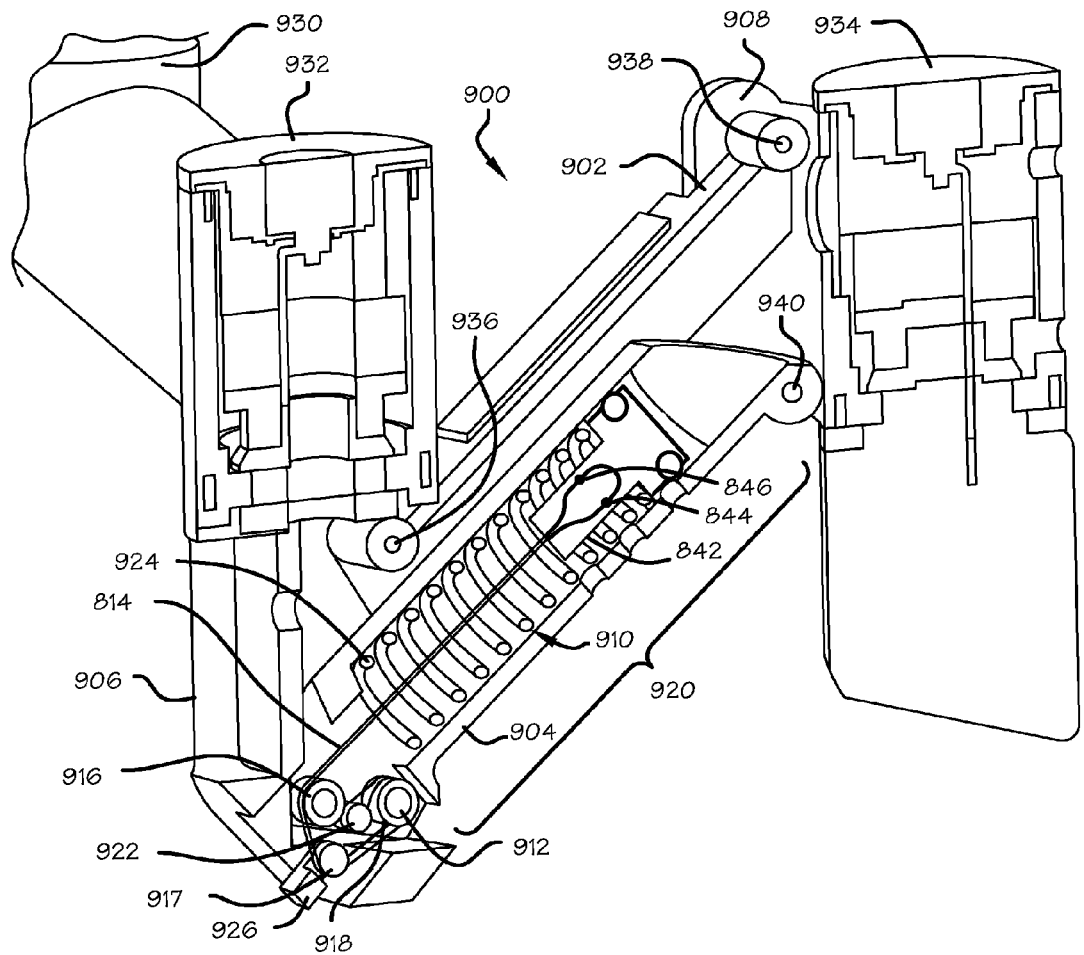
FIG. 9 is a right side cutaway view of a set-up arm with yet another spring counterbalance system that embodies the invention.

FIG. 9 shows a cutaway view of a portion of a set-up joint arm that may be used to support a surgical robotic manipulator and provide initial positioning of the manipulator as disclosed in U.S. patent application Ser. No. 11/627,934, which is included herein by reference. The set-up joint arm may include rotational joints 930, 932, 934 that connect links in the arm.

The link shown connecting the second 932 and third 934 rotational joints includes a parallelogram linkage structure 900. The parallelogram linkage structure 900 includes an idle link 902, a counter balancing link 904, a proximal bracket 906, and a distal bracket 908. The idle link 902 is pivotally coupled to the proximal bracket 906 at a pivotal joint 936 and to the distal bracket 908 at a pivotal joint 938. The counter balancing link 904 is pivotally coupled to the proximal bracket 906 at a pivotal joint 912 and to the distal bracket 908 at a pivotal joint 940. The pivotal joints 936, 912, 938, 940 are located at the corners of the parallelogram linkage structure 900. The counter balancing link 904 includes a substantial portion of a spring-cable-pulley balancing mechanism 910 that generally operates around a pivotal joint 912. The pulleys are arranged such that the spring provides tension in the cable that acts on the parallelogram linkage structure 900 to counterbalance a load supported by the third rotational joint 934.

The spring-cable-pulley balancing mechanism 910 includes a doubled cable 814 coupled to the set-up arm that is wrapped over a plurality of pulleys 916-818 and tensioned by a compressible spring assembly 920. The cable 814 may couple to the set-up arm by coupling to the set-up joints or the counter balancing link 904. In the embodiment shown in FIG. 9, the cable 814 may have a first end that is fixed to the counter balancing link at a pin or post 922, wraps over the plurality of pulleys 916-818 in one direction, passes through a U-shaped channel in cable attachment 842, then route back and wrap over the pulleys 916-918 in a reverse direction, and have the second end of the cable fixed to the counter balancing link at the pin or post. Wrapping the cable through the cable attachment 842 in this manner is a convenient way to have segments of a single cable act like a redundant pair of cables. The cable attachment 842 may be similar to the cable attachment shown in FIG. 8. The cable 814 includes two protrusions 844, 846 that are retained in the cable attachment 842 such that the cable can slide only a short distance within the cable attachment.

In one embodiment of the invention, the plurality of pulleys 916-918 are of equal diameter. Each of the pulleys 916-918 may include one or more tracks in which the cable 814 is wrapped and guided to substantially maintain alignment. Pulley 918 is concentric with the pivotal joint 912 coupling to a shaft at the pivotal joint. With the cable 814 wrapped over it, the pulley 918 does not rotate relative to the counter balancing link 904. However, the counter balancing link 904 and the pulley 918 rotate together about the pivotal joint 912 with respect to the bracket 906. Pulley 917 is rotatably coupled to an adjustable mount 926 that is coupled to the bracket 906. The adjustable mount 926 may slide in the bracket 906 to adjust the position of pulley 917 and further adjust the tension in the cable 814 and spring 924 during set-up and maintenance. However, the adjustable mount 926 is rigidly fixed in placed during operational periods so that the position of the pulley 917 rotatably coupled to the adjustable mount 926 does not change. Pulley 916 is rotatably coupled to the housing of the link 904 and thus pivots with the link about the pivotal joint 912. The center points or center point positions of the pulleys 916-918 are the corners or vertices of a triangle. Changing the length of one of the sides of the triangle adjusts the counter-balancing mechanism for variations in spring rate or the amount of weight being balanced.

A sensor is coupled to one of the pulleys 916-918 to sense anomalous rotation of the pulley caused by a breakage in the redundant structure of the cable or in the coil spring. In this way, the breakage can be detected even though the slight drop of the counterbalanced load might otherwise go unnoticed.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

What is claimed is:

1. A spring counterbalance system comprising:
   a load;
   a spring;
   a cable having a first protrusion fixed to the cable midway between two ends of the cable, the two ends being fixedly coupled to one of the load and the spring;
   a cable attachment that is coupled to the other of the load and the spring, the cable passing through the cable attachment such that the first protrusion is captive in the cable attachment and is movable between two stops in the cable attachment, the cable forming two segments each of which couples the spring and the load;
   a pulley over which the two segments of the cable pass; and
   a sensor to sense rotation of the pulley.

2. The spring counterbalance system of claim 1 wherein the spring is compression spring and the cable passes through the spring and is coupled to the spring such that the load causes the spring to be compressed.

3. The spring counterbalance system of claim 1 wherein the cable attachment includes a U shaped slot, the central portion of the slot being large enough to receive the first protrusion and allow it to slide within the slot, the two end portions of the slot being large enough to receive the cable and small enough to form the two stops that limit the movement of the protrusion.

4. The spring counterbalance system of claim 1 wherein: the cable has a second protrusion fixed to the cable; the two stops of the cable attachment comprise a first stop at an end of a first channel and a second stop at an end of a second channel; the first protrusion slides within the first channel until reaching the first stop at the end of the first channel; and the second protrusion slides within the second channel until reaching the second stop at the end of the second channel.

5. The spring counterbalance system of claim 1 wherein the sensor is a Hall effect array.

6. The spring counterbalance system of claim 1 wherein the sensor senses a rotational position of the pulley.

7. The spring counterbalance system of claim 1 wherein the sensor senses one of angular velocity and angular acceleration of the pulley.

8. A spring counterbalance mechanism comprising:
   a spring;
   a cable having two ends, a midpoint, and a first protrusion fixed to the cable substantially at the midpoint;
   means for coupling the two ends of the cable to a load;
   means for loosely coupling the midpoint of the cable to the spring through which the cable passes such that the protrusion is held captive and is movable between two stops such that two segments of the cable couple the spring to the load;
   a pulley over which the two segments of the cable pass; and
   means for sensing rotation of the pulley.

9. The spring counterbalance mechanism of claim 8 wherein the spring is a compression spring and the cable passes through the spring and is coupled to the spring such that the load causes the spring to be compressed.

10. The spring counterbalance mechanism of claim 8 wherein the means for loosely coupling the midpoint of the cable to the spring includes a U shaped slot, the central portion of the slot being large enough to receive the first protrusion and allow it to slide within the slot, the two end portions of the slot being large enough to receive the cable and small enough to form the two stops that limit the movement of the protrusion.

11. The spring counterbalance mechanism of claim 8 wherein: the cable has a second protrusion fixed to the cable; the two stops of the means for loosely coupling the midpoint of the cable to the spring comprise a first stop at an end of a first channel and a second stop at an end of a second channel; the first protrusion slides within the first channel until reaching the first stop at the end of the first channel; and the second protrusion slides within the second channel until reaching the second stop at the end of the second channel.

12. The spring counterbalance mechanism of claim 8 wherein the means for sensing rotation of the pulley is a Hall effect array.

13. The spring counterbalance mechanism of claim 8 wherein the means for sensing rotation of the pulley senses a rotational position of the pulley.

14. The spring counterbalance mechanism of claim 8 wherein the means for sensing rotation of the pulley senses one of angular velocity and angular acceleration of the pulley.

15. A method for balancing a load with a spring, the method comprising:
   coupling two ends of a cable to the load;
   loosely coupling a midpoint of the cable to the spring such that two segments of the cable couple the spring to the load;
   passing the two segments of the cable over a pulley;
   maintaining the coupling of the midpoint of the cable to the spring with only one of the two cable segments; and
   sensing rotation of the pulley when the coupling of the midpoint of the cable to the spring with only one of the two cable segments first occurs.

16. The method of claim 15 wherein the spring is compression spring and the method includes passing the cable through the spring and coupling the cable to the spring such that the load causes the spring to be compressed.

17. The method of claim 15 further comprising providing the cable with at least one protrusion adjacent the midpoint and supporting the protrusion against a stop to maintain the coupling of the midpoint of the cable to the spring with only one of the two cable segments.

18. The method of claim 15 further comprising providing a Hall effect array for sensing rotation of the pulley.

19. The method of claim 15 wherein sensing rotation of the pulley senses a rotational position of the pulley.

20. The method of claim 15 wherein sensing rotation of the pulley senses one of angular velocity and angular acceleration of the pulley.

\* \* \* \* \*